(12) United States Patent
Nurminen et al.

(10) Patent No.: US 7,670,456 B2
(45) Date of Patent: Mar. 2, 2010

(54) METHOD AND DEVICE FOR TREATING WATER

(75) Inventors: Teppo Nurminen, Vantaa (FI); Mauri Salmisuo, Tuusula (FI)

(73) Assignee: STERIS Europe Inc. Suomen Sivuliike, Tuusula (FI)

( * ) Notice: Subject to any disclaimer, the term of this patent is extended or adjusted under 35 U.S.C. 154(b) by 85 days.

(21) Appl. No.: 10/556,864

(22) PCT Filed: May 14, 2004

(86) PCT No.: PCT/FI2004/000292

§ 371 (c)(1),
(2), (4) Date: Dec. 13, 2006

(87) PCT Pub. No.: WO2004/101440

PCT Pub. Date: Nov. 25, 2004

(65) Prior Publication Data

US 2007/0151840 A1 Jul. 5, 2007

(30) Foreign Application Priority Data

May 16, 2003 (FI) ................................. 20030735

(51) Int. Cl.
*B01D 1/22* (2006.01)
*B01D 1/26* (2006.01)
*B01D 3/28* (2006.01)
*C02F 1/04* (2006.01)

(52) U.S. Cl. ..................... 159/49; 159/13.2; 159/17.1; 202/174; 202/182; 202/236; 203/10; 203/72

(58) Field of Classification Search ................ 159/13.2, 159/17.1, 27.1, 49; 202/154, 155, 174, 182, 202/236; 203/10, 72, 100; 165/115
See application file for complete search history.

(56) References Cited

U.S. PATENT DOCUMENTS

| 3,099,607 A | 7/1963 | Lustenader et al. | 202/64 |
| 3,099,697 A | 7/1963 | Lustenader et al. | 202/64 |
| 3,849,259 A * | 11/1974 | Steinbruchel | 202/174 |
| 3,875,017 A | 4/1975 | Saari et al. | 202/174 |

(Continued)

FOREIGN PATENT DOCUMENTS

CA    2 236 479    5/1997

(Continued)

OTHER PUBLICATIONS

Hemming, Werner, "Verfahrenstechnik," p. 145, Würzburg: Vogel, 1984.

*Primary Examiner*—Virginia Manoharan
(74) *Attorney, Agent, or Firm*—Kusner & Jaffe; Michael A. Centanni

(57) ABSTRACT

In a multi-effect falling-film evaporator, purified water for special purposes is produced. In each effect, a steam phase and a water phase is produced from the feed water. The steam phase is used for heating in the subsequent effect, whereby it condenses to product water, and the water phase becomes the feed stream for the subsequent effect. A reject stream is removed from the process to carry off impurities separated from the water. According to the invention, a reject stream is removed from each effect. Preferably, each reject stream is a condensed fraction of the steam generated in the respective effect.

3 Claims, 1 Drawing Sheet

U.S. PATENT DOCUMENTS

| | | | |
|---|---|---|---|
| 3,878,054 A * | 4/1975 | Rodgers | 203/11 |
| 3,897,314 A | 7/1975 | Liebsch et al. | 203/89 |
| 3,926,739 A * | 12/1975 | Izumi | 202/173 |
| 4,018,656 A * | 4/1977 | Rogers et al. | 203/11 |
| 4,166,773 A | 9/1979 | Higley et al. | 203/72 |
| 4,167,437 A * | 9/1979 | Gilbert | 159/28.1 |
| 4,330,373 A * | 5/1982 | Liu | 202/174 |
| 4,698,138 A | 10/1987 | Silvey | 203/91 |
| 4,938,868 A | 7/1990 | Nelson | 203/1 |
| 4,981,555 A | 1/1991 | Hohmann et al. | 159/13.2 |
| 5,391,262 A | 2/1995 | Wilkerson, Jr. | 203/10 |
| 5,409,576 A * | 4/1995 | Tleimat | 202/174 |
| 5,853,549 A * | 12/1998 | Sephton | 203/2 |
| 5,972,171 A | 10/1999 | Ross et al. | 203/40 |
| 6,656,327 B2 * | 12/2003 | Salmisuo | 203/10 |

FOREIGN PATENT DOCUMENTS

| | | |
|---|---|---|
| DE | 19928064 | 12/2000 |
| EP | 0610505 | 8/1994 |
| FI | 79790 | 11/1989 |
| JP | 10328501 | 12/1998 |
| WO | WO 02/24299 | 3/2002 |
| WO | WO2004/020066 | 3/2004 |

* cited by examiner

METHOD AND DEVICE FOR TREATING WATER

RELATED APPLICATIONS

This application is a National Stage entry of International Application No. PCT/FI04/00292, filed May 14, 2004, the entire specification, claims and drawings of which are incorporated herewith by reference.

FIELD OF THE INVENTION

The invention relates to the production of highly purified water for special purposes. Particularly, the invention relates to the production of purified water using falling-film evaporators with subsequent condensation.

BACKGROUND OF THE INVENTION

For the purpose of this text, "purified water" means generally water of greater purity than ordinary potable water available from e.g. a municipal water distribution system. Highly purified water is required e.g. for various medical purposes, such as production of pharmaceuticals, and in the production of "water for injection", the quality of which is defined in official pharmacopoeias. Plants for producing such purified water may be designed as so-called multi-effect stills, employing a series of falling film evaporators. A falling film evaporator comprises a vertical bundle of evaporation tubes enclosed into a heating jacket. Water fed into the evaporating tubes at their upper end flows down the inner surface of the tubes, thereby evaporating and forming steam, which emerges at the lower ends of the tube bundle together with any un-vaporized water. In many devices for producing highly purified steam or water, the flow of steam makes a 180° turn and flows upwards in a rising space provided therefore, while the remaining water collects at the bottom of the device.

The upward-flowing steam may, depending on the type of device, undergo various kinds of demisting and/or purification operations, whereby the separated droplets and impurities finally join the water phase at the bottom of the effect while the steam enters the heating jacket of the subsequent effect. The water phase becomes the feed water of the subsequent effect and the steam condenses, giving off its heat to cause more steam to evaporate from the feed water, and the cascade continues until the last effect is reached. The combined condensates from the heating jackets, together with the steam from the last effect, are cooled and condensed, respectively, in a final heat exchanger to form the purified product water.

In prior art multi-effect falling-film plants for producing purified water, the feed to each effect generates a steam phase and a residual leaving water phase. The residual water phase then, in its entirety, generates the feed for the next effect and so on, until the last effect is reached. The residual water in the last effect represents the reject fraction containing the impurities.

In this context, a reject stream is a stream of water, which is permanently removed from the process. Generally, the reject stream is liquid water, but maybe a steam-liquid mixture. A continuous process for producing pure water by evaporation must include the removal of a sufficient amount of reject water to carry away the separated impurities. The ratio of reject water to product water is an important aspect of the efficiency of the process. It follows from the material balance, that if the reject stream is insufficient, the impurities either accumulate in the device or leave with the product, which both alternatives are highly undesirable.

In Finnish patent application 20021538, a unit for producing pure steam is disclosed. This device includes a particular purification section for the steam, having a rising spiral path following the evaporation section, which is a falling-film unit as described above. In the outer wall of the spiral path, apertures are provided, and outside said apertures a cool surface. This arrangement creates a pressure gradient across the apertures due to condensation of steam on the cool surface, causing impurity-containing droplets to migrate through the apertures and collect on the cool surface. The least pure component of the rising stream in the spiral path thus travels to the periphery and leaves through the apertures, condenses on the cool surface and forms a water phase rich in impurities, which flows down the cool surface. This water phase rich in impurities may be isolated and not returned to the process, but separated as a reject stream.

In Japanese patent 10328501, a two-effect falling film evaporator is disclosed having a centrifugal demister adapted to the second effect. The steam phase from the first effect enters the demister, droplets are separated and form a stream, which can be discharged or conducted to the pipe transferring the liquid phase from the first to the second effect. The demisted steam phase enters the heating side of the second effect.

SUMMARY OF THE INVENTION

The present invention relates to the production of purified water in a multi-effect still or evaporation plant utilizing the type of devices described above for purified steam production. A falling-film evaporation plant for the production of purified water may comprise a plurality of evaporation stages or effects. Water is fed to each effect, and water and steam leaves each effect. According to the present invention, a reject stream is withdrawn from each effect. Thus, each effect in a multi-effect falling-film evaporation plant for producing purified water comprises means for the withdrawal of a reject stream. In one embodiment of the present invention, the reject stream may be withdrawn as liquid water from the fraction of water that is not vaporized in an evaporation section, i.e. the residual water. A fraction of the residual water phase may thus be split off before it is conducted to the subsequent effect.

According to a preferable embodiment, each effect as a physical unit comprises a rising channel for the steam phase generated in the effect, and means for separating an impurity-containing fraction from the rising steam. The "steam phase" in this context is a water vapor phase in the vicinity of its saturation point, and thus generally contains minute water droplets. The impurity-containing fraction, which may thus comprise steam and water droplets, is permanently separated from the process and not passed on to the next effect. Preferably, the fraction is essentially allowed to condense to be withdrawn in the form of liquid water.

Thus, the effect units all comprise the same components, i.e. falling-film heat transfer channels, water phase collection compartment, steam phase rising channel with droplet separator, and collection compartment for the separated droplets.

The present invention provides several advantages, particularly in the embodiment described above. The total amount of reject water is decreased, as a smaller proportion is required to carry impurities. A greater proportion of water can be evaporated in each effect, compared to the prior art. The impurities separated from the feed in each effect are not carried over to the next effect, and do not come into contact with heat exchange surfaces further downstream. Scaling is thus avoided. The recycling of the residual water from the last effect is also made feasible, as this fraction does not contain such an increased level of impurities as in the prior art.

BRIEF DESCRIPTION OF THE DRAWING

The invention is more thoroughly disclosed in the following, with reference to the appended FIGURE, which schematically shows the main components of a plant according to the invention.

DISCLOSURE OF THE INVENTION

Figure 1:
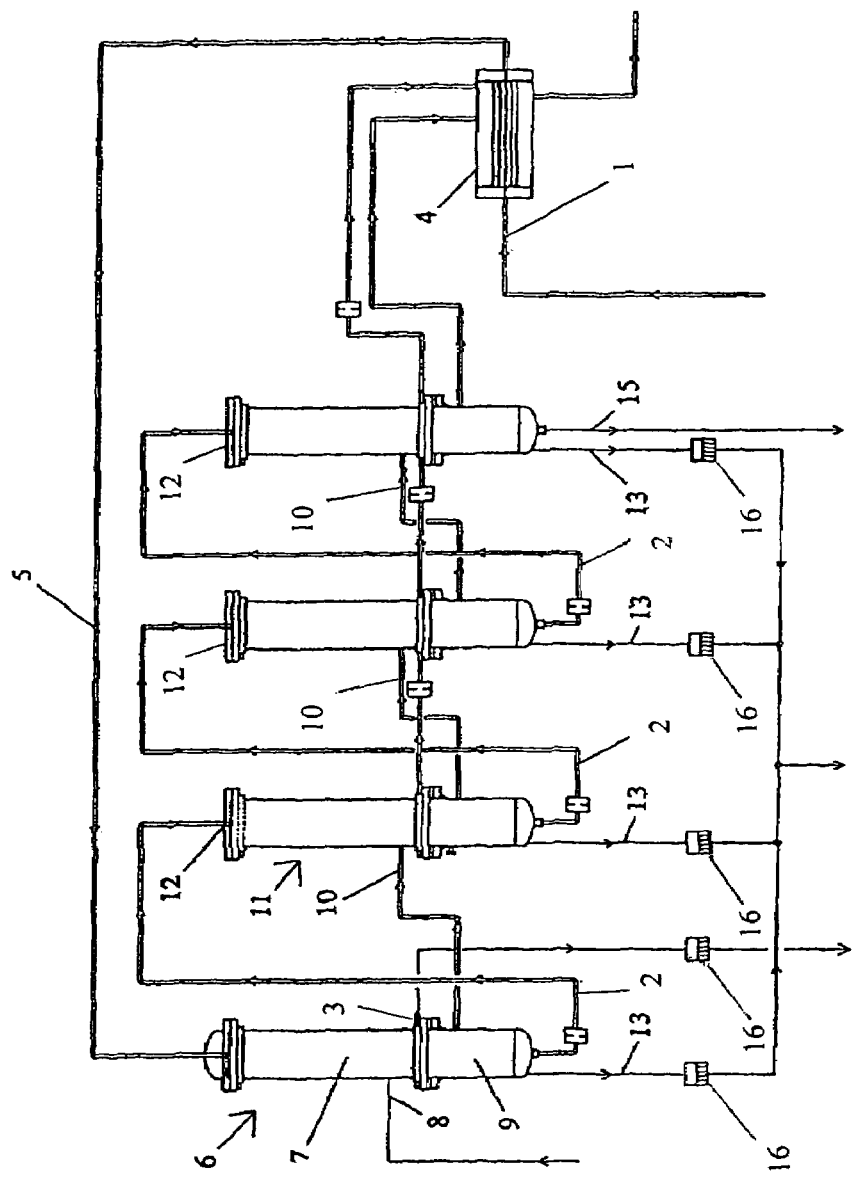

FIG. 1 shows an embodiment of a four-effect production plant for pure water according to the invention. Feed water, preferably purified by means of filtering and ion exchange or other appropriate methods, enters at inlet 1. After passing heat recovery exchanger 4, the feed stream enters, through transfer line 5, the first falling-film evaporation unit 6. Transfer line 5 may be provided with additional heat exchange devices to improve the overall heat recovery, as the person skilled in the art may contemplate.

Plant steam or another primary heat transfer medium entering at inlet 8 heats the shell side of the falling film evaporation section 7. As the feed water flows down as a film on the inner walls of the evaporating tubes (not shown), the water partly evaporates into steam, which emerges from the lower end of the tubes together with the remaining water. Within separation section 9, the steam makes a 180° turn and enters a rising channel. After passing the rising channel, the steam is led through transfer line 10 to the shell side of the falling film evaporation unit of the subsequent effect 11. The water phase collects on the bottom of the effect, leaves the effect at outlet 2 and is conducted to the feed inlet 12 of the subsequent effect. A reject stream is withdrawn via conduit 13.

In each evaporation effect, the same sequence occurs. Feed water is partially evaporated to steam in the falling film section. The steam generated in each effect is carried over to heat the feed water in the subsequent effect, and the residual water that has not been converted into steam becomes the feed water of the next effect. The residual water from the last effect may be discarded or recycled.

In an embodiment of separation section 9, disclosed in greater detail in Finnish patent application 20021538 referred to above, the rising channel for steam generated in each effect has the form of a spiral pathway, causing the impurity-containing droplets entrained in the steam to travel to the periphery of the spiral, where they migrate through apertures in the outer wall of the rising channel. Outside the apertures, the droplets, along with steam, condense on a surface having a temperature sufficiently low for this to occur. The water film forming on this surface, containing the separated impurities, flows down by gravity and the water is collected in a separate, isolated shell space, from where a reject stream is withdrawn.

Thus, in an embodiment of this type having means for separating a fraction of the generated steam, the steam in each effect is depleted of a contaminant-enriched fraction in the corresponding separation section; these fractions are isolated in separate compartments and form reject streams, exiting via conduits 13 in FIG. 1. Preferably, the reject lines are provided with steam traps 16. As impurities are removed from all effects from the first on-wards, they are not accumulated in the final residual water as in the prior art.

The stream leaving the shell side of the falling film section of the first effect is commonly factory steam condensate, and is removed at outlet 3. The primary heat source can also be another heat transfer medium, whereby appropriate re-circulation is provided, or electrical heating elements.

Beginning from the second effect, the condensate from the shell side of the falling film section, which condensate stems from the evaporated part of the initial feed water, is collected and fed to the shell side of the falling film section of the next effect. Thus, the evaporated fractions are finally combined in the shell of the final effect, from which they are taken out and cooled in a heat exchanger 4 together with the steam phase of the final effect. Preferably, this heat exchanger delivers heat to the initial feed water stream.

The temperature and pressure conditions in the individual effects are adjusted as required. In the first effect, the temperature corresponds to that of the primary heating medium, resulting in a corresponding steam pressure. Throttle devices may be provided between effects, and the pressure decreases sequentially until preferably being near atmospheric in the final effect.

From the last effect, a residual water phase is withdrawn at outlet 15 and may be discarded as an additional reject stream, recycled, or split between these.

The invention claimed is:

1. A method for producing purified water using a multi-effect falling-film evaporation process, said method comprising the steps of:
   a) introducing a feed water into an inner wall of an evaporation tube in a first evaporation effect and plant steam to an exterior of said evaporation tube in said first evaporation effect, said plant steam heating said evaporation tube and said feed water disposed in said evaporation tube to produce steam and residual water from said feed water;
   b) flowing said residual water in a first conduit and flowing said steam in a second conduit, separate from said first conduit;
   c) supplying said residual water produced in said evaporation effect into an inner wall of an evaporation tube in a subsequent evaporation effect;
   d) removing a fraction of said steam produced from said feed water from said evaporation effect as a reject stream by flowing said steam through a spiral channel to remove said fraction of said steam therefrom and flowing said fraction of said steam to an isolated compartment and removing said reject stream from said isolated compartment by flowing said reject stream in a third conduit;
   e) supplying a remainder of said steam produced from said feed water through a fourth conduit to an exterior of said subsequent evaporation tube in said subsequent evaporation effect, wherein said steam heats said evaporation tube and said feed water disposed in said evaporation tube in said subsequent evaporation effect to produce steam and residual water; and
   f) repeating steps b)-e) for each subsequent evaporation effect.

2. The method according to claim 1, wherein said reject stream is condensed to liquid water.

3. A device for the production of purified water having a plurality of effects, each said effect comprised of:
   a falling film evaporation section having evaporating tubes therein, said tubes for producing a steam and a residual water from feed water introduced into said tubes, wherein said feed water is introduced into an inner wall of said evaporating tubes and a primary heat transfer medium is introduced into a shell side of said evaporation section,
   a separation section for separating said steam from said residual water, having a channel for conducting said steam from said effect, a channel for conducting said residual water to an inner wall of evaporating tubes in a subsequent effect, a spiral channel for separating a fraction of said steam from said channel for conducting said steam, and an isolated compartment for collecting said steam conducted out of said effect, said isolated compartment being connected to said channel for conducting said steam out of said effect, a conduit for conducting a portion of said steam produced from said feed water, out of said evaporation effect as a reject stream, and a conduit for conducting a remaining portion of said steam to an exterior of said evaporating tubes in said subsequent evaporation effect.

* * * * *